United States Patent [19]

Nishimura et al.

[11] 4,424,568
[45] Jan. 3, 1984

[54] METHOD OF CONTROLLING INTERNAL COMBUSTION ENGINE

[75] Inventors: Yutaka Nishimura; Yoshishige Oyama, both of Katsuta; Hiroshi Kuroiwa; Minoru Osuga, both of Hitachi, all of Japan

[73] Assignee: Hitachi, Ltd., Tokyo, Japan

[21] Appl. No.: 229,840

[22] Filed: Jan. 30, 1981

[30] Foreign Application Priority Data

Jan. 31, 1980 [JP] Japan .................................. 55-11349
Jan. 31, 1980 [JP] Japan .................................. 55-11410

[51] Int. Cl.³ .......................... F02B 3/04; F02D 5/02; F02M 51/00
[52] U.S. Cl. ............................... 364/431.07; 123/440; 123/492; 123/493; 364/431.05
[58] Field of Search ............. 364/569, 431.04, 431.05, 364/431.06, 431.07; 123/440, 488, 489, 491, 492, 493

[56] References Cited

U.S. PATENT DOCUMENTS

| 4,197,767 | 4/1980 | Leung | 364/569 X |
| 4,227,507 | 10/1980 | Takase et al. | 123/492 |
| 4,319,327 | 3/1982 | Higashiyama et al. | 364/431.05 |
| 4,321,903 | 3/1982 | Kondo et al. | 123/492 |
| 4,370,968 | 2/1983 | Nakatomi | 123/489 |
| 4,372,274 | 2/1983 | Takase | 123/492 X |

*Primary Examiner*—Felix D. Gruber
*Attorney, Agent, or Firm*—Antonelli, Terry & Wands

[57] ABSTRACT

A method controls of the amount of fuel, ignition timing and the amount of exhaust reflux recirculation during transient operations of an internal combustion engine such as acceleration and/or deceleration. In this method, the present data of the intake air flow rate or intake negative pressure and previously-derived data with respect thereto are utilized to control the amount of fuel to be injected based on an extrapolation or correction method.

15 Claims, 17 Drawing Figures

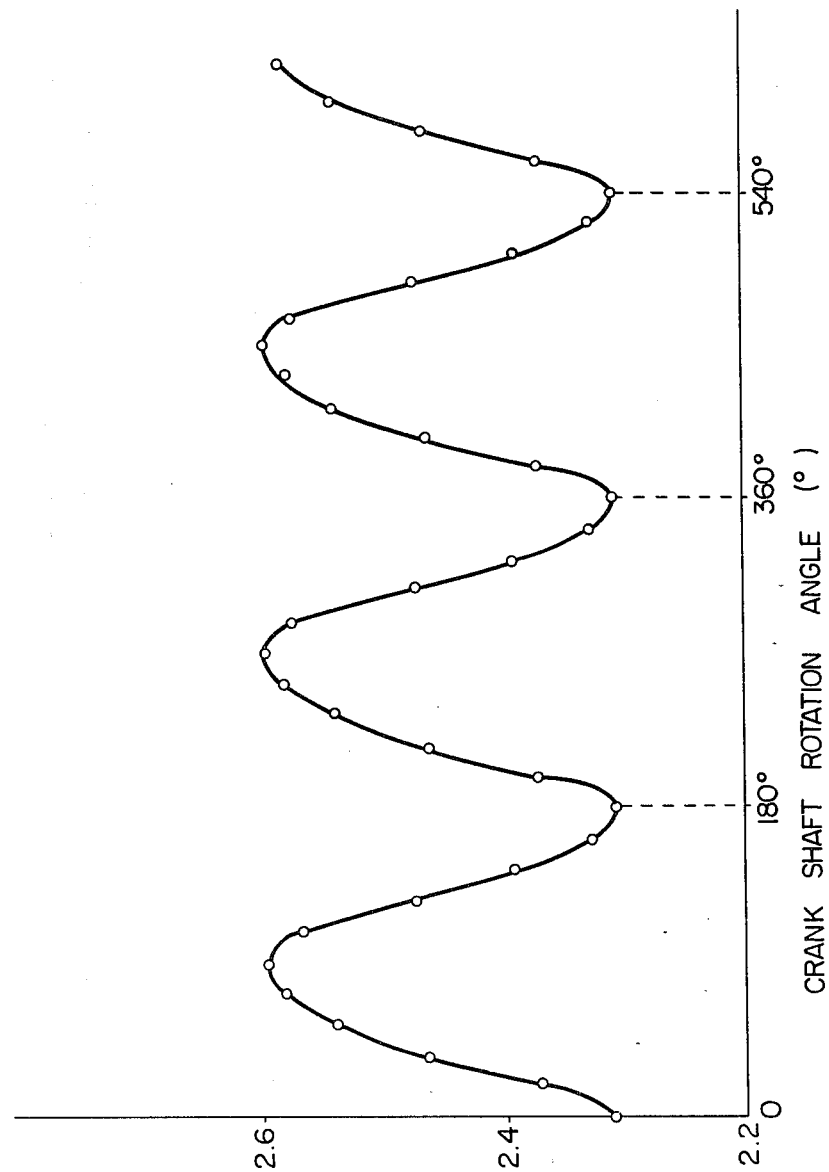

METHOD OF CONTROLLING INTERNAL COMBUSTION ENGINE

BACKGROUND OF THE INVENTION

This invention relates to a control apparatus for an internal combustion engine utilizing an electronic control device comprised of a microcomputer, and more particularly to a method of operating the control apparatus, for adjusting to an optimum condition the air/fuel ratio of a mixture fed to a combustion chamber, the amount of the mixture and ignition timing during transient operations such as acceleration and/or deceleration by utilizing the electronic control device.

Increases in the price of petroleum and regulations of environmental pollution have created the desirability for a high degree of compatibility among fuel consumption, exhaust gas and running performance of automobile engines. An electronic control device has been employed which can determine the desired amount of fuel, ignition timing and the amount of exhaust reflux (recirculation) through an interpolation calculation using signals representative of the amount of intake air and revolution of the engine as well as map data stored beforehand and through a correcting calculation of cooling water temperature and intake air temperature. This ensures that the substantially ideal amount of fuel, ignition timing and amount of exhaust reflux can be obtained during stationary operation.

A conventional method has been characterized, however, such that in an engine with a carburetor, the fuel supply is increased by a fixed amount in response to depression of the acceleration pedal irrespective of the degree of acceleration, resulting in insufficient control. Even in an engine with a fuel injector as controlled by the electronic control device, the control of fuel, ignition timing and exhaust reflux during a transient operation such as acceleration and/or deceleration has put aside.

Although the presently available control apparatus can assure the substantially ideal control of the amount of fuel, ignition timing and the amount of exhaust reflux during stationary operation as mentioned above, it faces difficulties with respect to attainment of optimum fuel quantity, ignition timing and exhaust reflux quantity during the transition operations such as acceleration and/or deceleration in which, because of an appreciable time required for taking out the signals representative of the amount of intake air and revolution and then calculating therefrom the amount of fuel to be supplied and ignition timing, operating the condition of the engine has already been changed at the termination of the calculation. The successive transient condition is, however, predominant during the actual running and, accordingly, it has been desired to establish a control method for obtaining an optimum amount of fuel, ignition timing and amount of exhaust reflux during the transition condition.

SUMMARY OF THE INVENTION

An object of this invention is to provide a method of controlling an internal combustion engine which can control at least the amount of fuel, ignition timing and amount of exhaust reflux to an optimum condition during the transient operations, thereby simultaneously attaining a reduction of specific fuel consumption and polluted exhaust gas.

As has been set forth in describing the prior art, the computer calculation requires a finite time and there is a waiting time before fuel is injected in response to a fuel injection time following the completion of the calculation, so that the operating condition has been changed at the time of actual fuel injection. To solve this problem, according to the present invention, the operating condition at the time of actual fuel injection is predicted by extrapolation from the past data, that is to say, an amount of air which would be taken into the combustion chamber at the time of actual fuel injection and an engine revolution at that time are predicted for calculation of the amount of supply fuel and ignition timing, thereby ensuring that the fuel supply quantity, ignition timing and exhaust reflux quantity can always be controlled to an optimum.

BRIEF DESCRIPTION OF THE DRAWINGS

FIG. 11 is a graphical representation showing the relation between a signal from a hot-wire type flow meter and crankshaft rotation angles.

DESCRIPTION OF THE PREFERRED EMBODIMENTS

Figure 1:
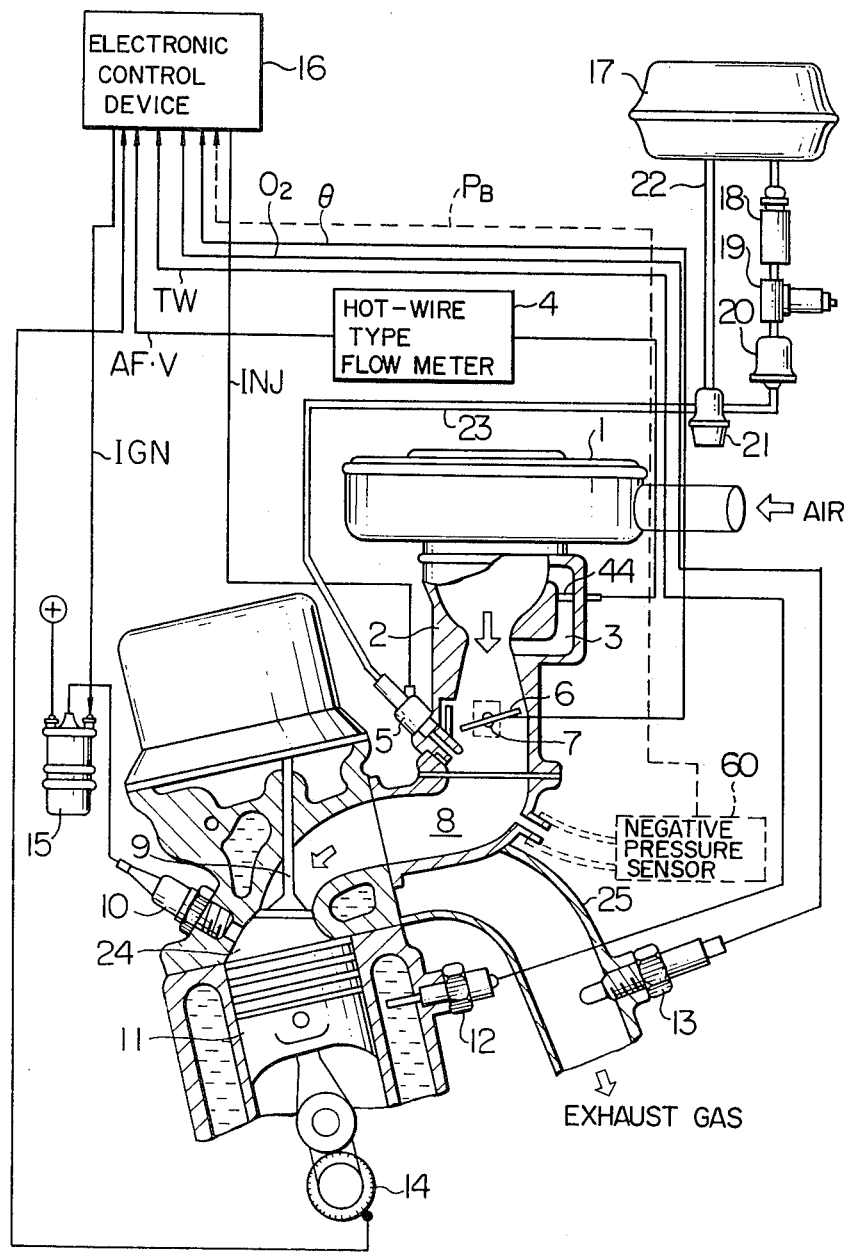
FIG. 1 is a schematic diagram, partly sectioned, of an internal combustion engine which is suitably incorporated with an internal combustion engine controlling method according to the invention.

Referring now to FIG. 1 schematically illustrating the construction of a control apparatus for an internal combustion engine, intake air is admitted to a combustion chamber 24 through an air cleaner 1, a throttle body 2, a throttle valve 6 with a throttle valve opening sensor 7, an intake pipe 8 and an inlet valve 9. The flow rate of intake air is measured by a hot-wire type air flow rate meter 4 using a hot wire 44 which is disposed in a bypass conduit 3 of the throttle body 2. An oxygen sensor 13 disposed in an exhaust pipe measures oxygen density contained in exhaust gas, and there is provided a temperature sensor 12 for measuring temperature of engine cooling water. Designated by a reference numeral 11 is a piston. Fuel from a fuel tank 17 is admitted through a fuel pump 18, a fuel damper 19, a filter 20, a fuel pressure regulator 21 and a fuel pipe 23 to a fuel injector 5 and fed out therefrom. The amount of fuel to be fed is determined by an electronic control device 16 which depends, for the determination, on signals from the air flow rate meter 4, oxygen sensor 13 and cooling water temperature sensor 12. The ignition timing is determined by an ignition coil 15 which responds to a signal from the electronic control device 16 comprised of a microcomputer so as to cause an ignition plug 10 to fire. A crank angle sensor 14 also participates in determination of the ignition timing.

Figure 2:
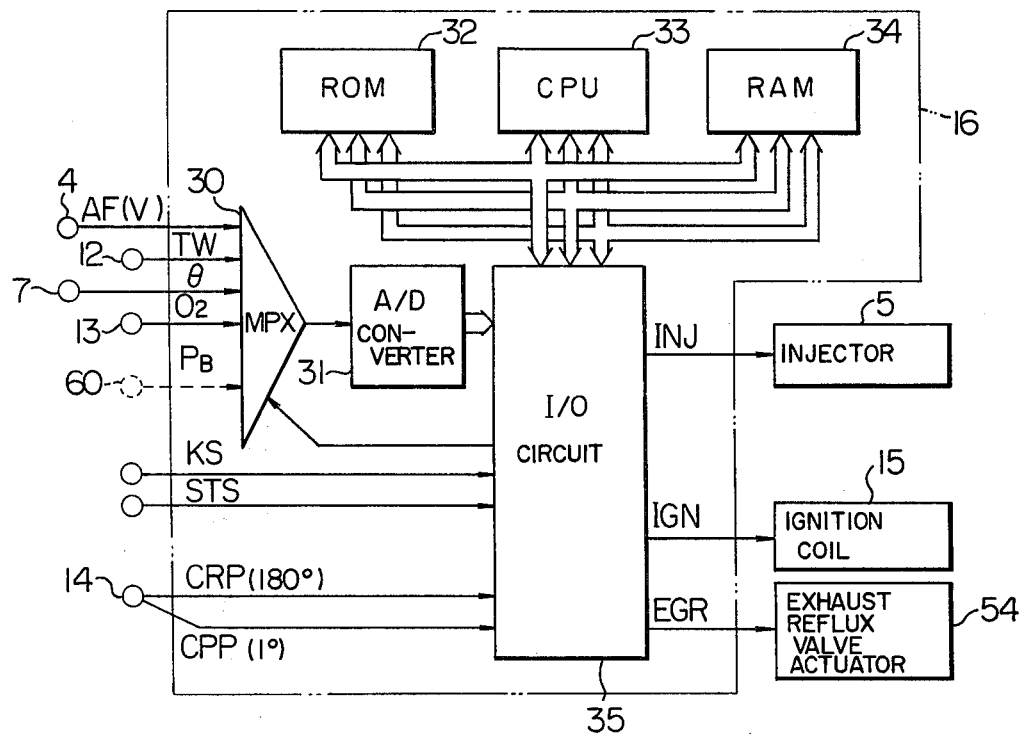
FIG. 2 is a block diagram showing details of an electronic control device shown in FIG. 1.

With reference to FIG. 2, details of the electronic control device 16 shown in FIG. 1 will be described. Input signals available for the device 16 are produced from the intake air flow meter 4, engine cooling water temperature sensor 12 and throttle valve opening sensor 7. The outputs of the individual sensors are fed to a multiplexer 30 and selected on a time division basis for transmission to an A/D converter 31 which delivers a digital signal. The electronic control device 16 also receives input information in the form of ON-OFF signals such as one bit digital signals KS and STS produced from an engine key switch (not shown) and a starter switch (not shown), respectively. The signal from the crank angle sensor 14, which is a train of pulses, is also applied to the device 16. There are provided a central processor unit 33 for digital processing operations, a read only memory 32 for storing control programs and fixed data, and a random access memory 34 capable of reading and writing data. An input/output circuit 35 is adapted to send the signals from the A/D converter and sensors to the central processor unit 33 and transmit the signals from the unit 33 to the injection valve 5, the ignition coil 5 and an exhaust reflux valve actuator 54.

Figure 3:
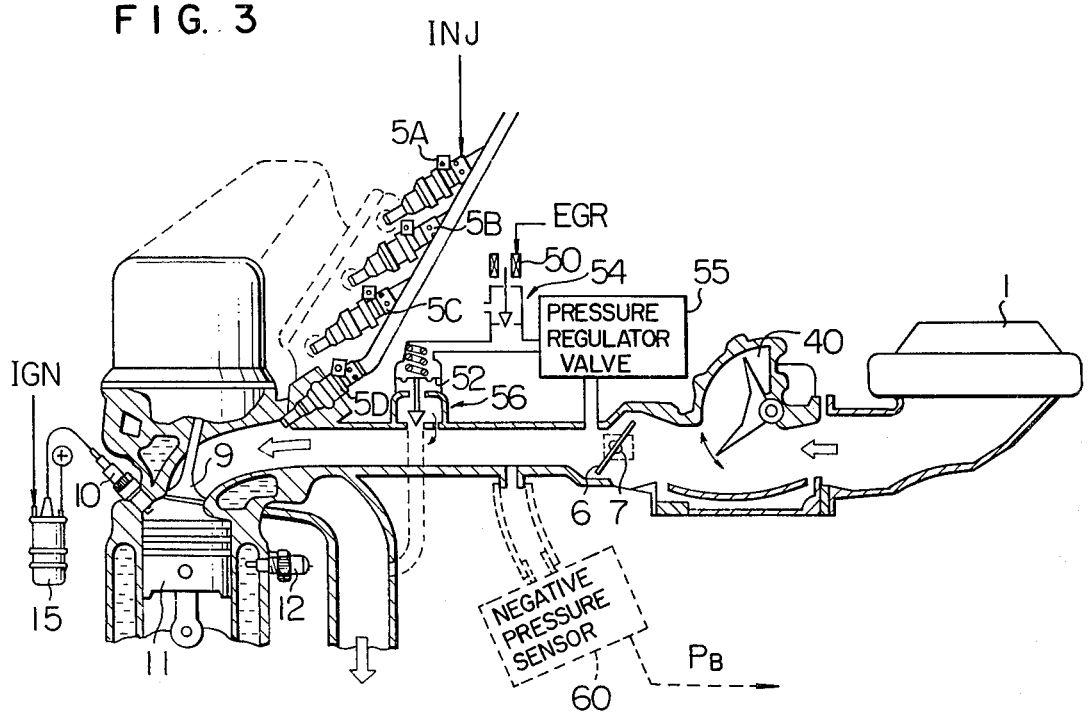
FIG. 3 is a schematic diagram, partly in section, of another internal combustion engine which is suitably applied with the controlled method according to the invention.

Illustrated in FIG. 3 is another type of an internal combustion engine control apparatus which is different from the FIG. 1 type having a single fuel injection valve 5 in that a plurality of fuel injection valves 5A to 5D associated with respective cylinders are arranged in close proximity of the intake valve. FIG. 3 apparatus also comprises an air flow rate meter 40 for measuring intake air flow rate admitted to the engine, and an actuator 54 connected to a known pressure regulator valve 55 coupled with a negative pressure source (not shown) for producing a fixed negative pressure, the actuator 54 serving to control a diaphragm 52 of a reflux valve 56. The actuator 54 includes a coil 50. Such pressure regulator valve 55, reflux valve 56 and actuator 54 are not shown in FIG. 1 for simplicity of illustration.

Figure 4:
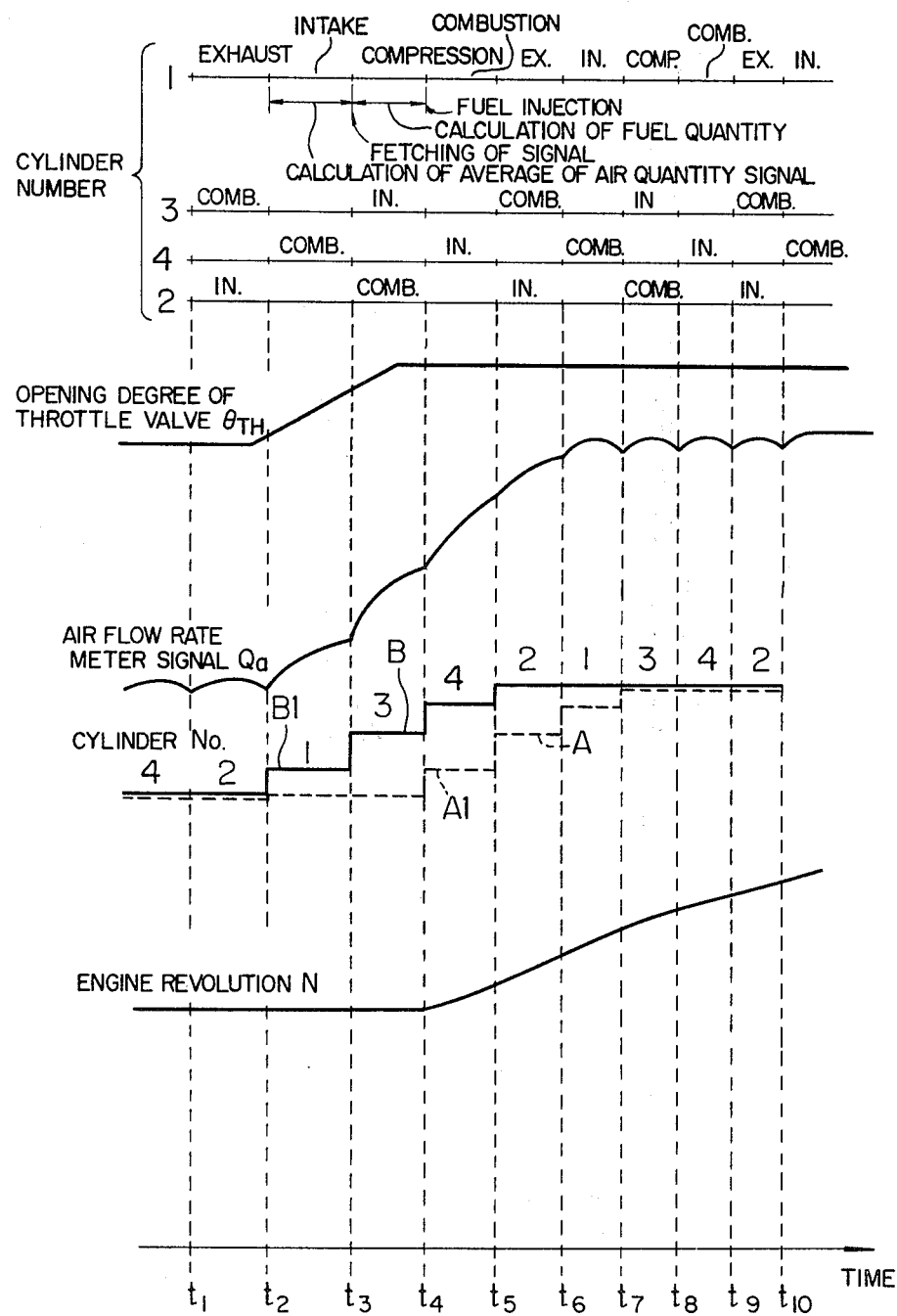
FIG. 4 is a graphical representation useful in explaining a conventional method for obtaining the amount of fuel from the flow rate of air and the engine revolution.

With the above construction, a conventional method calculates the amount of injection fuel based on a signal representative of the amount of intake air as will be described with reference to FIG. 4. When considering a four-cylinder and four-cycle process, an average of the signals from the air flow rate meter which are generated during the intake stroke of, for example, the first cylinder (for example, the average corresponds to an accumulative value of the air flow rate meter signals generated during the intake stroke or an output signal of the air flow rate meter generated at a specified crank angle) is fetched by the central processor unit 33 at the end of the intake stroke of the first cylinder and a suitable fuel flow rate is calculated or provided by using map data stored in the ROM 32. The fuel is drawn into the fourth cylinder. The calculation is carried out during the compression stroke of the first cylinder. If the first, third, fourth and second cylinders are fired in this order, the fuel injection is carried out at the beginning of the combustion stroke of the first cylinder, in other words, at the beginning of the intake stroke of the fourth cylinder, so that the injected fuel is drawn into the fourth cylinder. However, as far as the transient operation is concerned, the amount of air drawn into the fourth cylinder will have deviated from the amount of air at the intake stroke of the first cylinder with the result that the air/fuel ratio of a mixture drawn into the fourth cylinder becomes different from an optimal value. In FIG. 4, a signal representative of the amount of air used for calculation of the amount of fuel at the time of fuel injection is illustrated at dotted line curve A, and the amount of air actually drawn into each of the cylinders at that time is illustrated at solid line curve B, showing a time relationship between curves A and B. It will be seen from FIG. 4, an output signal Q of the air flow meter changes as the opening degree of the throttle valve changes. The output signal pulsates as shown in the figure and it is averaged as shown at solid line curve B. It will be appreciated that an average of the amount of air B1 at the time of intake stroke, ranging from times $t_2$ to $t_3$, should be used for calculation of the amount of fuel to be fed to the fourth cylinder. A level A1 occurring on curve A between times $t_4$ and $t_5$ is even with the average B1. In this manner, the calculation time and the injection waiting time, which are not significant during the stationary operation, inevitably cause a mixture actually drawn into the cylinders during the transient operation to considerably deviate from the intended mixture. The above explanation for the four-cylinder engine is also applicable to six-cylinder engines and engines of a multi-injector type. To cure this problem, the invention provides a correction method as will be described with reference to FIG. 5.

Figure 5:
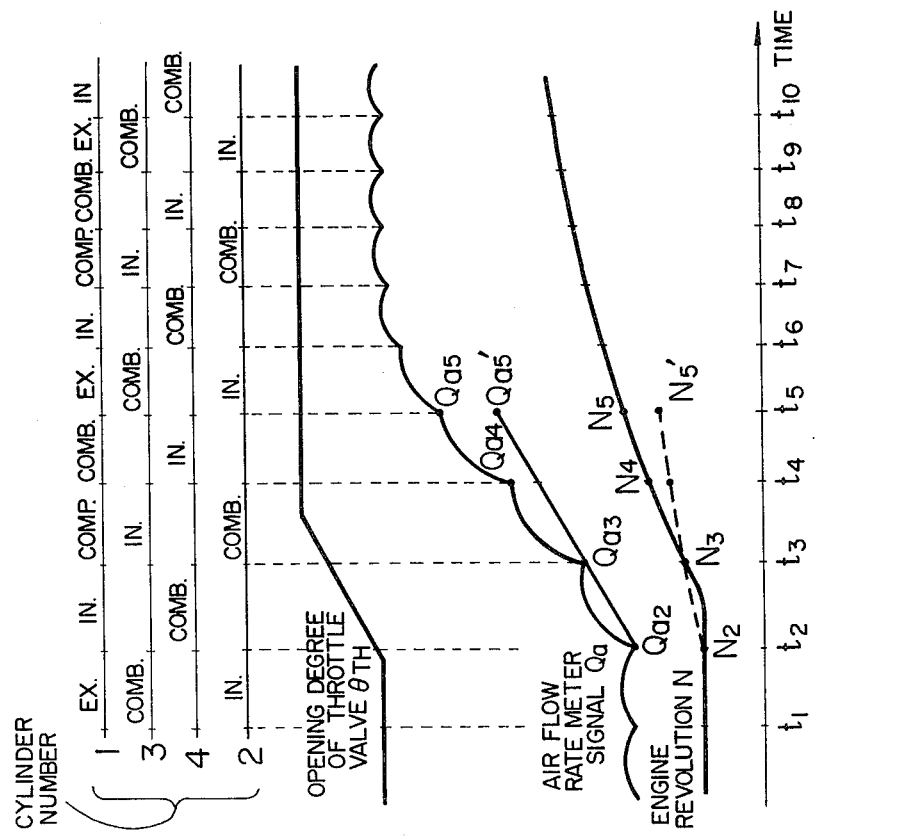
FIG. 5 is a graphical representation useful in explaining an extrapolation method of the invention for obtaining the amount of fuel to be injected.

Referring to FIG. 5, an average signal $Q_{a3}$ of the air quantity signal is fetched at time $t_3$ for calculation of the amount of fuel and the fuel injection starts at a time between $t_4$ and $t_5$ as explained with reference to FIG. 4. The actual amount of intake air is, however, $Q_{a5}$.

Figure 6:
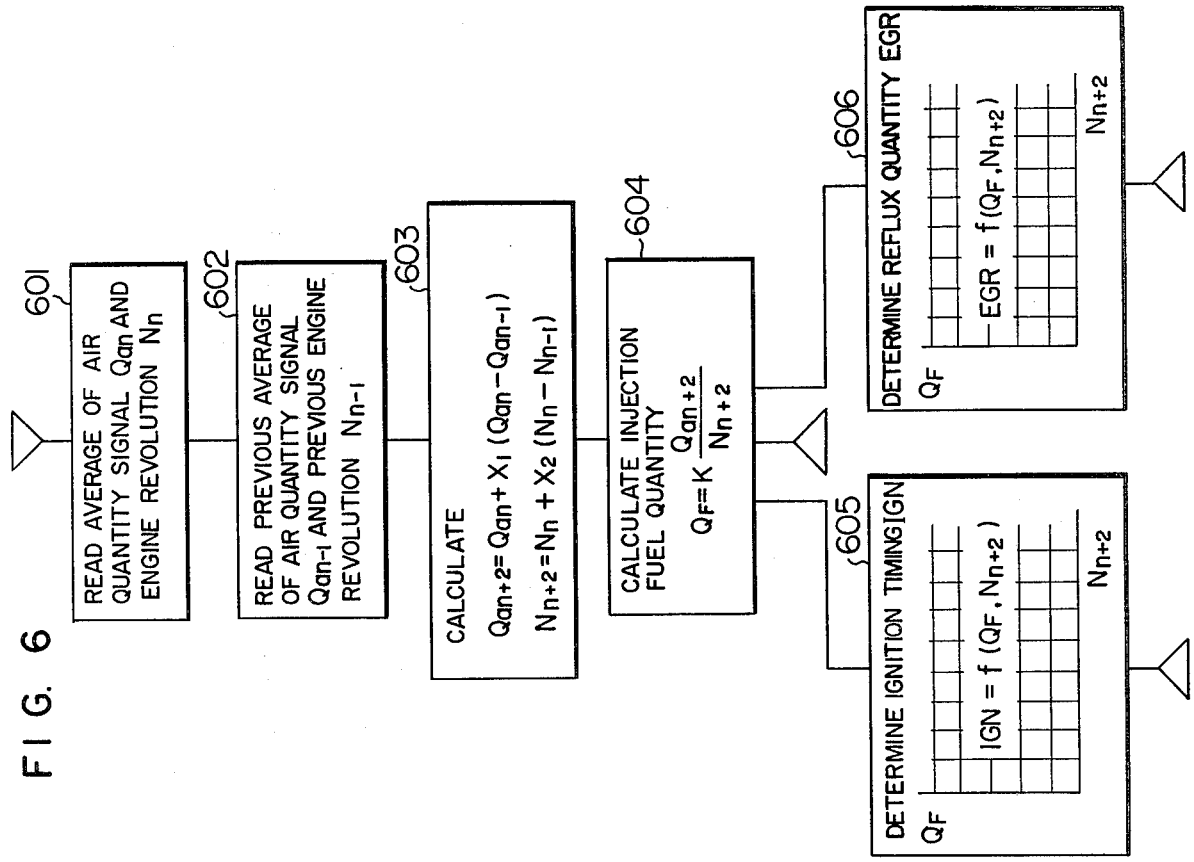
FIG. 6 is a flow chart employed for determining the amount of fuel injection, ignition timing and amount of exhaust reflux in accordance with an extrapolation method of the invention.

Therefore, it is necessary to estimate, at time $t_3$, an estimation value $Q_{a5}'$. To this end, an average signal $Q_{a2}$ of the air quantity at time $t_2$ stored in a storage included in the electronic control device 16 and an average signal $Q_{a3}$ at time $t_3$ are used to estimate the $Q_{a5}$ in accordance with the following equation:

$$Q_{a5}' = Q_{a3} + X_1(Q_{a3} - Q_{a2}) \quad (1)$$

where $X_1$ represents a weighting coefficient which is 0.5 to 2.0, for example. This estimation which is repeated successively is also applicable to the case of deceleration. Thus, in this estimation, an extrapolation is carried out which uses an air quantity signal at the time of fetching thereof and a previous air quantity signal to extrapolate an air quantity signal at the time of actual injection. FIG. 6 is a flow chart in accordance with this extrapolation.

If the acceleration or deceleration condition is identified by detecting acceleration or deceleration in the engine without resort to the variation of the air quantity average signal, in place of an average of the air quantity signal at the intermediate position of the intake stroke, an air quantity signal generated at the end of the intake stroke may be used for the calculation of the amount of fuel.

A similar problem is encountered in setting the ignition timing. As shown in FIG. 5, even when the ignition timing at time $t_3$ is calculated from air quantity signal $Q_{a3}$ and engine revolution $N_3$ and for example, an ignition timing before the upper dead point is set to 20°, in the conventional method, the thus set ignition timing cannot be proper at time $t_4$ at which the actual ignition is carried out since the engine revolution (speed) has changed. Accordingly, in accordance with the invention, the speed at time $t_5$ is estimated at time $t_3$. An estimation value $N_5'$ is determined, as in equaation (1), in accordance with the following equation:

$$N_5' = N_3 + X_2(N_3 - N_2) \quad (2)$$

where $X_2$ is a weighting coefficient. The ignition timing is from the estimation value $N_5'$ and the average air quantity signal $Q_{a5}$.

By the above correction, the air/fuel ratio of a mixture fed to the combustion chamber, the amount of the mixture and ignition timing can be maintained at optimum values even when the engine is accelerating and-/or decelerating.

Referring to FIG. 6, an average air quantity signal $Q_{an}$ and an engine revolution $N_n$ are read from a storage (RAM) included in the electronic control device in step 601, and a previous average air quantity signal $Q_{an-1}$ and a previous engine revolution $N_{n-1}$ are read from the storage in the next step 602. The data thus read in steps 601 and 602 are calculated in the electronic control device in accordance with equations as indicated in step 603, where $X_1$ and $X_2$ are weighting coefficients. Results of the calculation, $Q_{an+2}$ and $N_{n+2}$, are calculated in accordance with a formula as indicated in step 604 to obtain an amount of injection fuel $Q_F$, Where K is a constant. This $Q_F$ corresponds to a signal INJ which is used to provide a signal which is applied to the injector 5, for injecting fuel. By using this amount of injection fuel $Q_F$, in step 605, an optimum ignition timing signal IGN is obtained from a data map set in the read only memory 32 that is prepared for correlating the engine speed (revolution) to the amount of injection fuel to define the optimum ignition timing signal IGN. The thus obtained signal is used to provide a signal which is applied to the ignition coil 15. Similarly, an optimum reflux quantity signal EGR is obtained from a data map in step 606 and the thus obtained signal is applied to the coil 50 of the actuator 54 which controls the reflux valve diaphragm 52. The routine as shown in this flow chart is started by a crank angle signal CRP.

In the foregoing embodiments, the air flow rate is utilized upstream of the throttle valve. But for a similar control, the intake negative pressure, which is downstream of the throttle valve, may be utilized. This is because changes of the air flow rate are equivalent to changes of the negative pressure. A control method based on extrapolation and utilizing the negative pressure will be described hereinafter.

Figure 7:
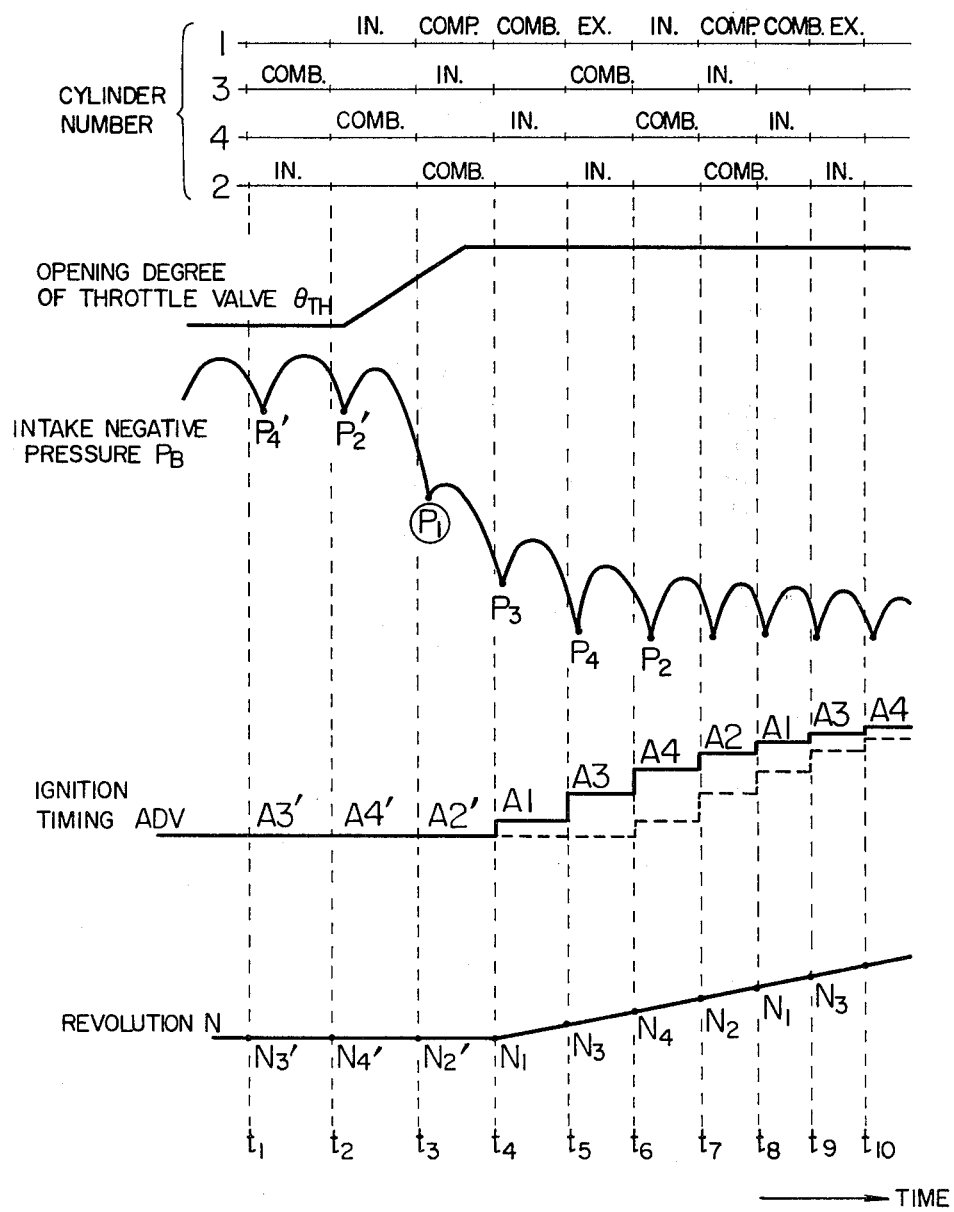
FIG. 7 is a graphical representation useful in explaining a conventional method for obtaining the ignition timing from the intake negative pressure and engine revolution.

When the electronic control device is applied to a four-cycle and four-cylinder engine of the type in which one injection is carried out during each of the intake strokes for the sake of controlling the ignition timing during acceleration operation, ideal ignition timing characteristics are shown at solid line curve and conventional ignition timing characteristics are shown at dotted line curve in FIG. 7, showing differences between these characteristics. As a fuel feed system, a multi-point fuel injection system in which each of the intake ports is provided with a fuel injector or a single-point fuel injection system in which a single fuel injector is provided for the base of intake manifolds may be employed. As shown in FIG. 7, when the opening degree, as designated by $\theta_{TH}$, of the throttle valve is rapidly increased on the way of the intake stroke of the first cylinder, an output signal $P_B$ from a known intake negative pressure sensor 60 pulsates and decreases toward a reduced negative pressure. If an ideal fuel supply is carried out in response to rapid changes in the engine operating condition, the engine revolution, as designated by N, varies as shown in FIG. 7. As well known in the art, the ignition timing required for the engine depends on the intake negative pressure or intake air supply and the engine revolution (here, exhaust reflux quantity is omitted). Accordingly, it is necessary that the ideal ignition timing be determined by the actual intake negative pressure during the intake stroke and the engine revolution occurring near the combustion stroke. In this way, the ideal ignition timing as shown at solid line curve ADV in FIG. 7 is determined.

However, in the conventional ignition timing control method utilizing a micro-computer, even when the throttle valve is rapidly opened on the way of the intake stroke of the first cylinder so that the signal $P_B$ from the known intake negative pressure sensor 60 changes from $P_2'$ to $P_1$ as shown in FIG. 7, a value $P_4'$ of the signal $P_B$ in advance of the first cylinder is fetched by the electronic control device for reasons as mentioned above. At the same time, a value $N_3'$ of the engine revolution N is also fetched. As a result, in spite of the fact that it is desirable to change the ignition timing for the first cylinder from a stationary value ($A_3'$, $A_4'$ or $A_2'$) to an ideal value $A_1$, the stationary value in advance of the acceleration still remains as shown at dotted line curve in FIG. 7. Similarly, since, in the third cylinder assuming the next intake stroke, the ignition timing is determined by a negative pressure value $P_2'$ and a revolution $N_4'$, it is ideal to realize the ignition timing as designated by $A_3$ which is determined by values $P_3$ and $N_3$ but the ignition timing still remains at the stationary value. Further, in the fourth cylinder assuming the subsequent intake stroke, the ignition timing is determined by $P_1$ and $N_2'$ and it corresponds to $A_1$ which is determined by $P_1$ and $N_1$ since $N_2'=N_1$ stands as shown in FIG. 7 graph. Ideally, however, a value $A_4$ is desired which is determined by $P_4$ and $N_4$. In the second cylinder assuming the further subsequent intake stroke, the ignition timing is determined by $P_3$ and $N_1$ and it is subject to a larger change than the ignition timing for the fourth cylinder since $P_1 > P_3$ and $N_2'=N_1$. Ideally, however, a value $A_2$ is desired which is determined by $P_2$ and $N_2$. In this way, the controlled ignition timings are successively delayed with respect to the ideal ignition timing values before the coincidence is obtained as $P_B$ and $N$ reach a steady state value.

As described above, the conventional ignition timing control methods fails to obtain characteristics which are in agreement with the engine requirements during the acceleration operation. With other types of engines, this also holds true.

Figure 8:
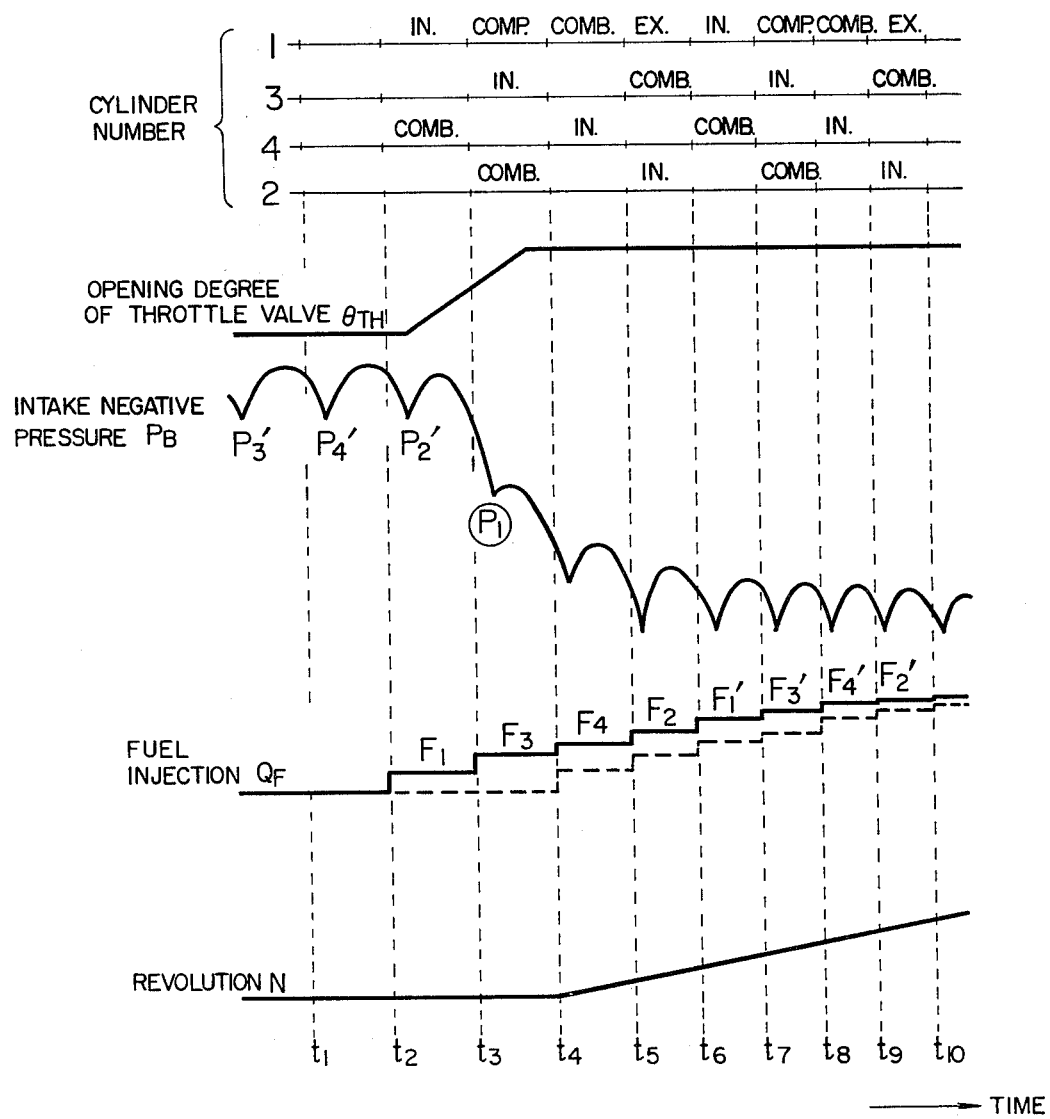
FIG. 8 is a graphical representation useful in explaining a conventional method for obtaining the amount of injection fuel from the intake negative pressure and engine revolution.

When the amount of injection fuel of a four-cycle and four-cylinder engine is calculated from the intake negative pressure and engine speed (revolution), the controlled injection fuel quantity deviates from the required injection fuel quantity during the acceleration operation as shown in FIG. 8.

Details of FIG. 8 are substantially the same as those of FIG. 7 and will not be described in detail.

Figure 9:
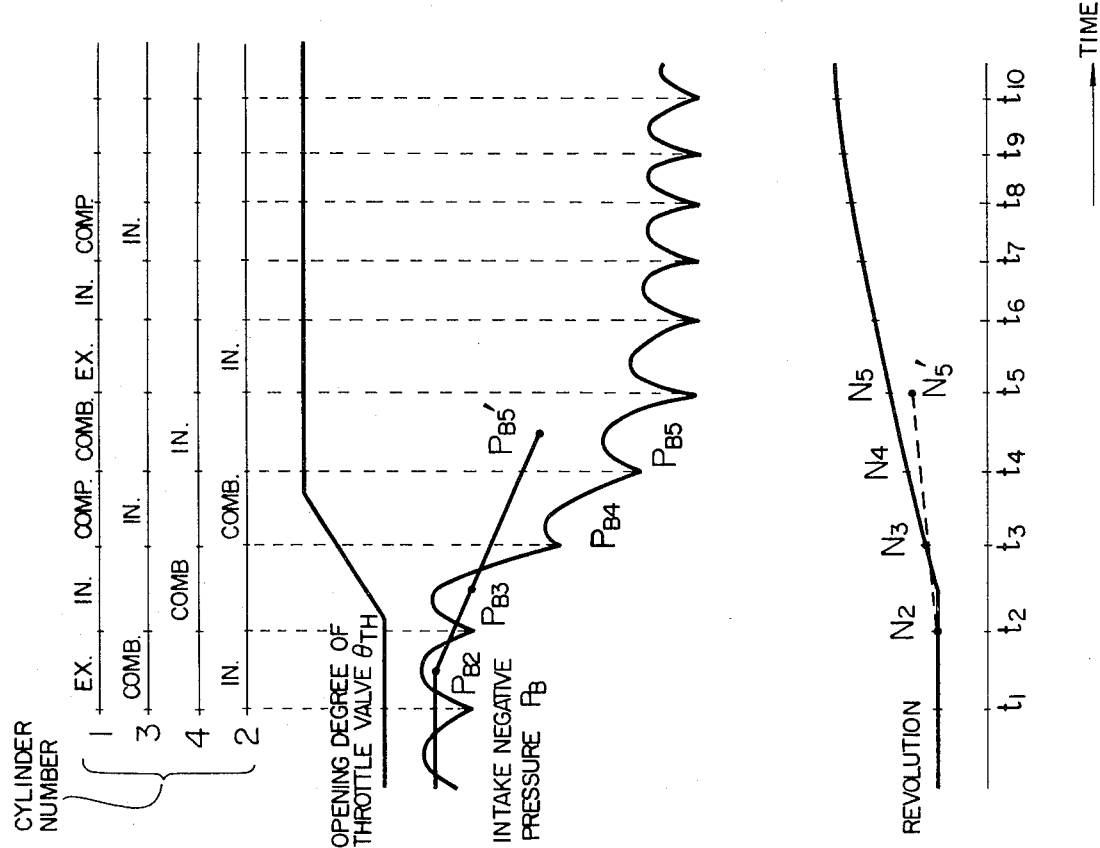
FIG. 9 is a graphical representation useful in explaining an extrapolation method of the invention for identifying the injection fuel from the intake negative pressure and engine revolution.
Figure 12:
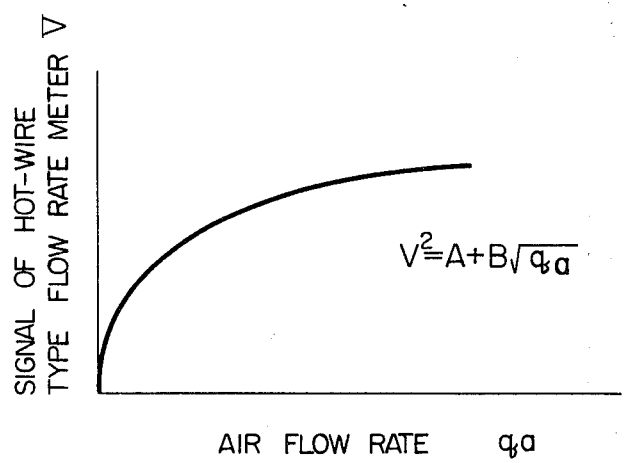
FIG. 12 is a graphical representation showing the relation between the signal from the hot-wire type flow meter and instantaneous values of air flow rate.

Referring to FIG. 9, a control method of the invention utilizing the intake negative pressure will be described. As described with reference to FIG. 7, an average signal $P_{B3}$ of the intake negative pressure in FIG. 9 is fetched at time $t_3$ to calculate the amount of fuel and the fuel injection is started at time $t_4$. At time $t_4$, however, the intake negative pressure has an actual value of $P_{B3}$ and it is necessary to estimate $P_{B5}$ at time $t_3$. To this end, average signals $P_{B2}$ and $P_{B3}$ of the intake negative pressure at times $t_2$ and $t_3$ and used to calculate an estimation value $P_{B5}'$ of the $P_{B5}$ in accordance with the following equation:

$$P_{B5}' = P_{B3} + X_3(P_{B3} - P_{B2}) \quad (3)$$

where $X_3$ represents a coefficient of weight which is 0.5 to 2.0, for example. This estimation which is repeated successively is also applicable to a case of deceleration. Thus, in this estimation, an extrapolation is carried out which uses an intake negative pressure signal at the time of fetching thereof and a previous intake negative pressure signal to extrapolate an intake negative pressure signal at the time of actual injection. Further, the revolution N is extrapolated as in equation (3). In this way, it is possible calculate the amount of injection fuel, ignition timing and amount of exhaust reflux from $P_{B5}'$ and $N_5'$.

Figure 10:
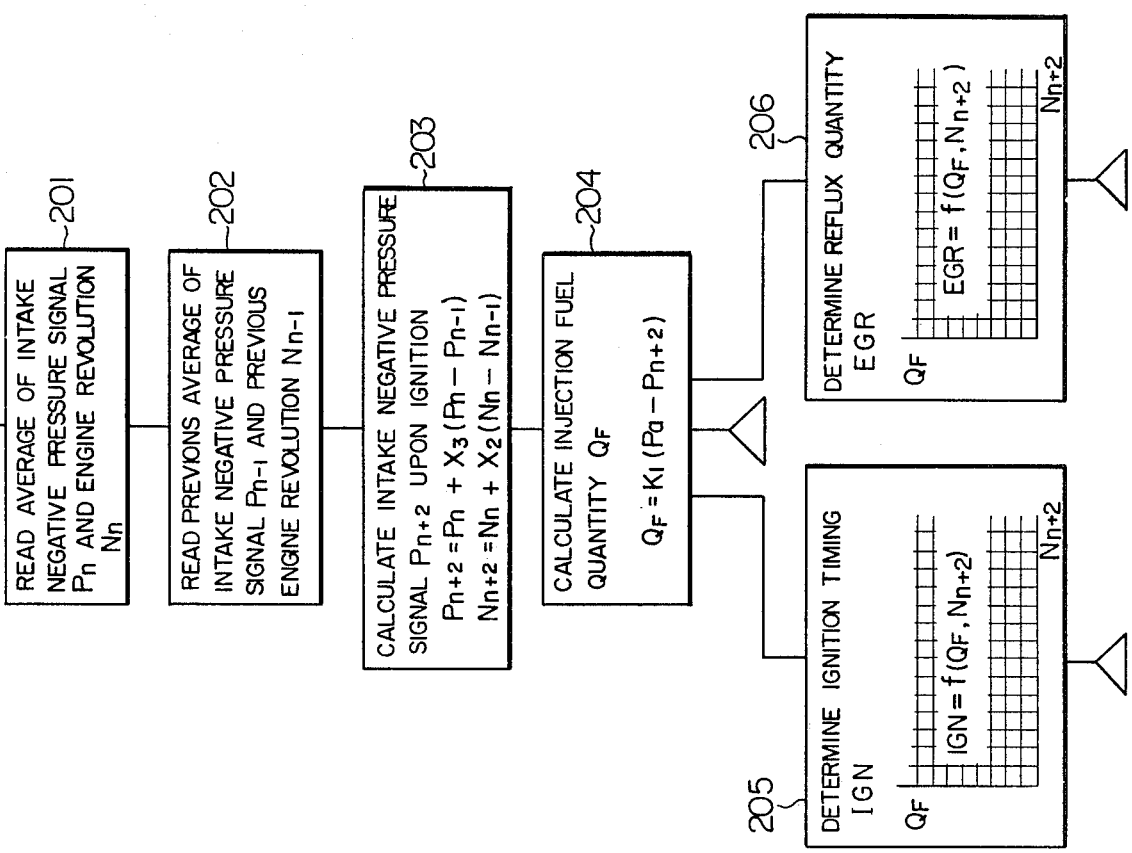
FIG. 10 is a flow chart similar to FIG. 6 employed for determining the amount of fuel injection, ignition timing and amount of exhaust reflux in accordance with an extrapolation method of the invention.

FIG. 10 shows a flow chart in accordance with this extrapolation and what is different from FIG. 6 is only replacement of the air flow rate with the intake negative pressure Pa and the corresponding equation governing the determination of fuel quantity $Q_F$. As shown in Block 204, the quantity of fuel to be injected is defined in accordance with the following equation $$Q_F = K_1(P_a - P_{n+2}) \quad (3A),$$

where
$K_1$ is a coefficient
$P_a$ is atmosphere pressure, and
$P_{n+2}$ is a previously obtained pressure.

Referring to FIG. 11, determination of the average of air flow rate meter signal generated during the intake stroke will be described. An example of the signal from the hot-wire type air flow meter 4 is illustrated at solid line curve in FIG. 11. Air drawn into the cylinder 11 pulsates because of reciprocation of the cylinder. Since the hot-wire type air flow meter has a faster response than other types of flow meters such as for example a movable vane type flow meter which is shown at 40 in FIG. 3, the signal from the hot-wire type air flow meter follows substantially the speed of actual air flow. Therefore, highly accurate results can be obtained when the accumulative value of the air flow rate during the intake stroke is used as the air quantity average during the intake stroke as compared when the instantaneous air flow rate meter signal at a specified crank angle is used. For a determination of the accumulative value, one method is such that the signal is successively accumulated by the use of an analog circuit during the intake stroke (for example, ranging from a 0° crank angle to a 180° crank angle), and the other is such that the signal is fetched intermittently at specified timings and the results are then accumulated. With the electronic control device 16 of the invention, the latter method can advantageously be realized in a simple manner. In order to fetch discrete values of the flow rate meter signal at points as designated by "°" in FIG. 11 into the electronic control device 16, one method is such that the flow rate meter signal is fetched at intervals of predetermined crank angles through the use of the signals from the crank angle sensor 14, and the other is such that the flow rate meter signal is fetched at intervals of predetermined times independent of the engine revolution through the use of a clock signal produced from the electronic control device 16. Both methods may be applied to the invention.

The process for determining the average of the air flow rate meter signal utilized for the extrapolation of the invention will now be described with reference to FIGS. 11 to 15.

The hot-wire flow rate meter signal in the form of a voltage V is related to an instantaneous value $q_a$ of the air flow rate by the following equation:

$$V^2 = A + B\sqrt{q_a} \quad (4)$$

where A and B are constants. Equation (4) is plotted in a graph shown in FIG. 12. Thus, to obtain the instantaneous air flow rate value $q_a$ from the output signal V of the flow rate meter, a square calculation is twice carried out in accordance with equation (4) or alternatively, based on a data table corresponding to FIG. 12 stored in the read only memory 32 included in the electronic control device 16, the instantaneous value $q_a$ is correlated to the signal V through a suitable interpolation. For calculation time of the computer, the latter is advantageous.

Figure 14:
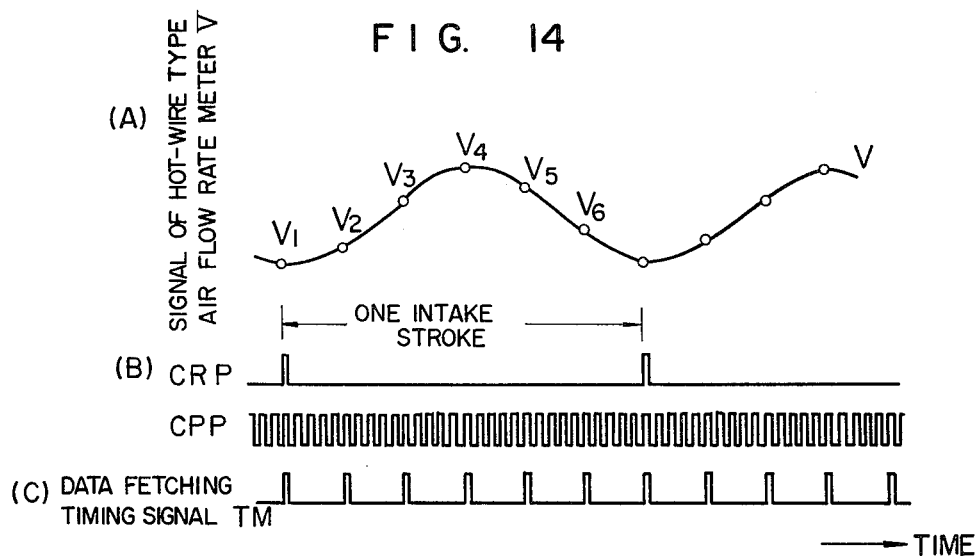
FIG. 14 illustrates in sections (A) through (C) the relation between the hot-wire type flow meter signal, crank angle pulses, data sampling timing pulses.

In FIG. 14, a signal CRP is selected from the signal of the crank angle sensor 14 and read at intervals of 180° for four-cylinder engines or at intervals of 120° for six-cylinder engines. Since one period of the signal CRP corresponds to one intake stroke, a signal CPP is read at intervals of crank angles of 1° or 2° and the flow rate meter signal V is read at intervals of specified crank angles of, for example, 10° or 20° to calculate the instantaneous air quantity $q_a$ in accordance with the equation (4) or to obtain it from the data map stored with the data corresponding to FIG. 12. Thereafter, individual instantaneous values $q_a$ are accumulated to provide an average air flow rate signal $Q_a$ during one intake stroke.

Figure 15:
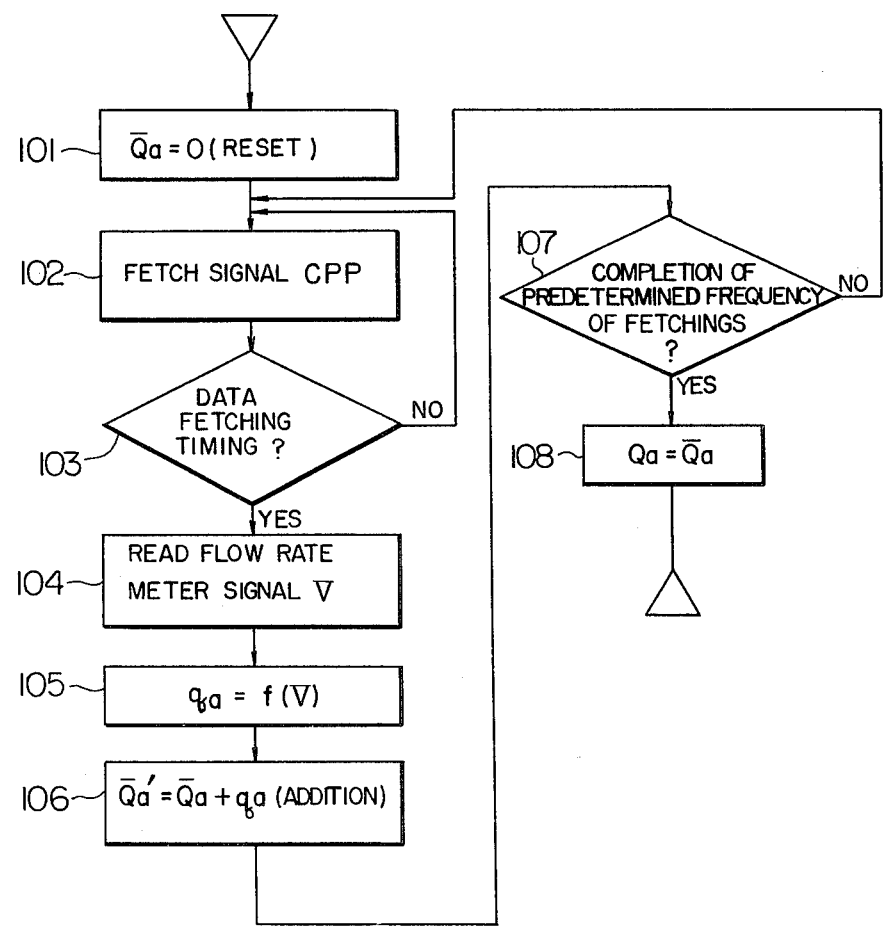
FIG. 15 is a flow chart useful in explaining a method of determining an average of the amount of air within one intake stroke.

Specifically, in the embodiment of FIGS. 14 to 15, a data fetching timing signal TM is generated at intervals of five CPP pulses, and six signals $V_1$ to $V_6$ are fetched by the use of the timing signal during one intake stroke as shown in FIG. 14.

In step 101 in FIG. 15, a value $\overline{Q_a}$ used in the subsequent step is reset, where $\overline{Q_a}$ represents a sum of instantaneous values $q_a$ of the air flow rate and is used as an intermediate value for the calculation of the average air flow rate $Q_a$. Next, the signal CPP is fetched (step 102), and on the data fetching timing TM (step 103), the flow rate meter signal V is fetched (step 104). Subsequently, based on the read value of signal V, the instanteneous value $q_a$ is calculated in accordance with equation (4) (step 105). In place of the calculation, the data map may be utilized. Thereafter, the instantaneous values $q_a$, i.e., $V_1$ to $V_6$ are added predetermined times (steps 106 and 107). In this example, the addition is carried out six times to calculate the average flow rate $Q_a$ during one intake stroke in the form of an integration value of instantaneous values $q_a$ (step 108).

The above description is given by way of an example wherein the signal is fetched at intervals of specified crank angles. When the signal is fetched at intervals of specified times, the signal CPP in step 102 may be replaced with a clock signal produced from the computer.

The above manner of determining the average signal may be applied to the intake negative pressure.

Figure 13:
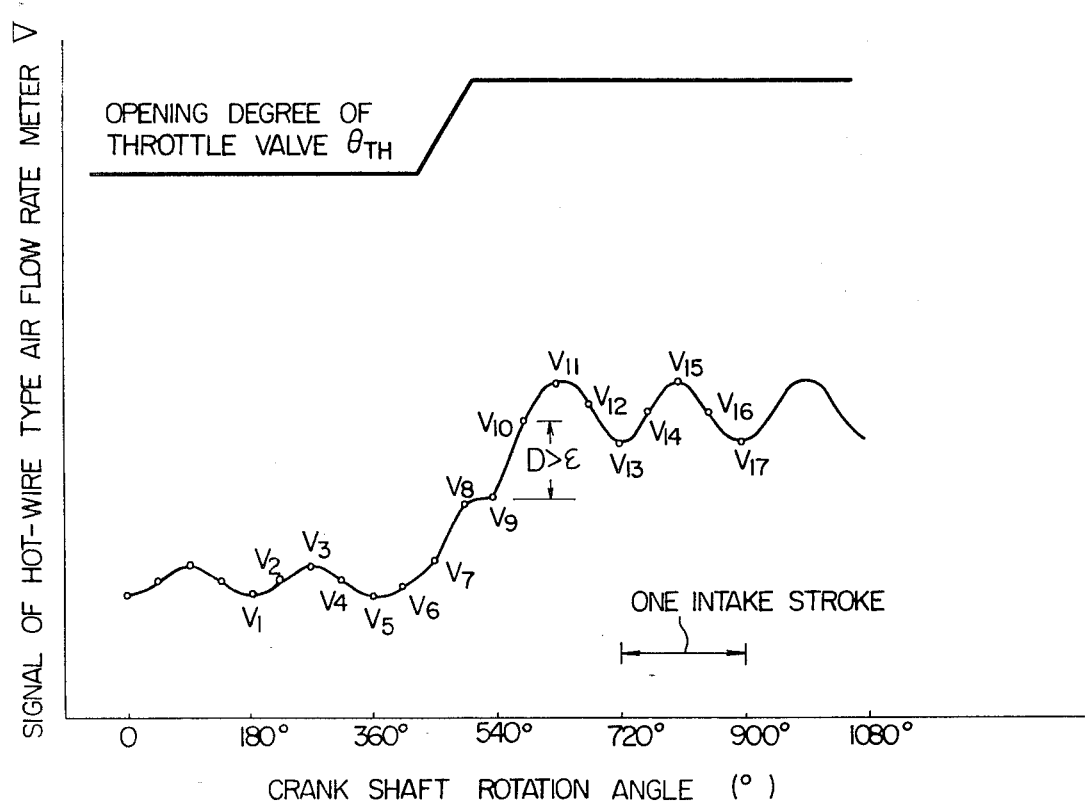
FIG. 13 is a graphical representation showing the relation between the opening degree of a throttle valve and the signal from the hot-wire type flow meter.

The extrapolation of the invention as described above uses the average of the air quantity in each of the intake strokes but alternatively, a fuel correction method may be realized which utilizes each of the instantaneous values produced from the hotwire type flow rate meter. More particularly, when an instantaneous value of the flow rate meter, for example $V_{10}$ in FIG. 13 is larger than a previous instantaneous value $V_9$ and a difference D exceeds a predetermined value $\epsilon$, a rapid acceleration of the engine operation is identified irrespective of the average during one intake stroke. As soon as the rapid acceleration is identified, the fuel supply is increased immediately (see section (B) in FIG. 17). Conversely, on a rapid deceleration, the frequency of the fuel injection is decreased (see section (C) in FIG. 17). This correction method excludes the extrapolation.

Figure 16:
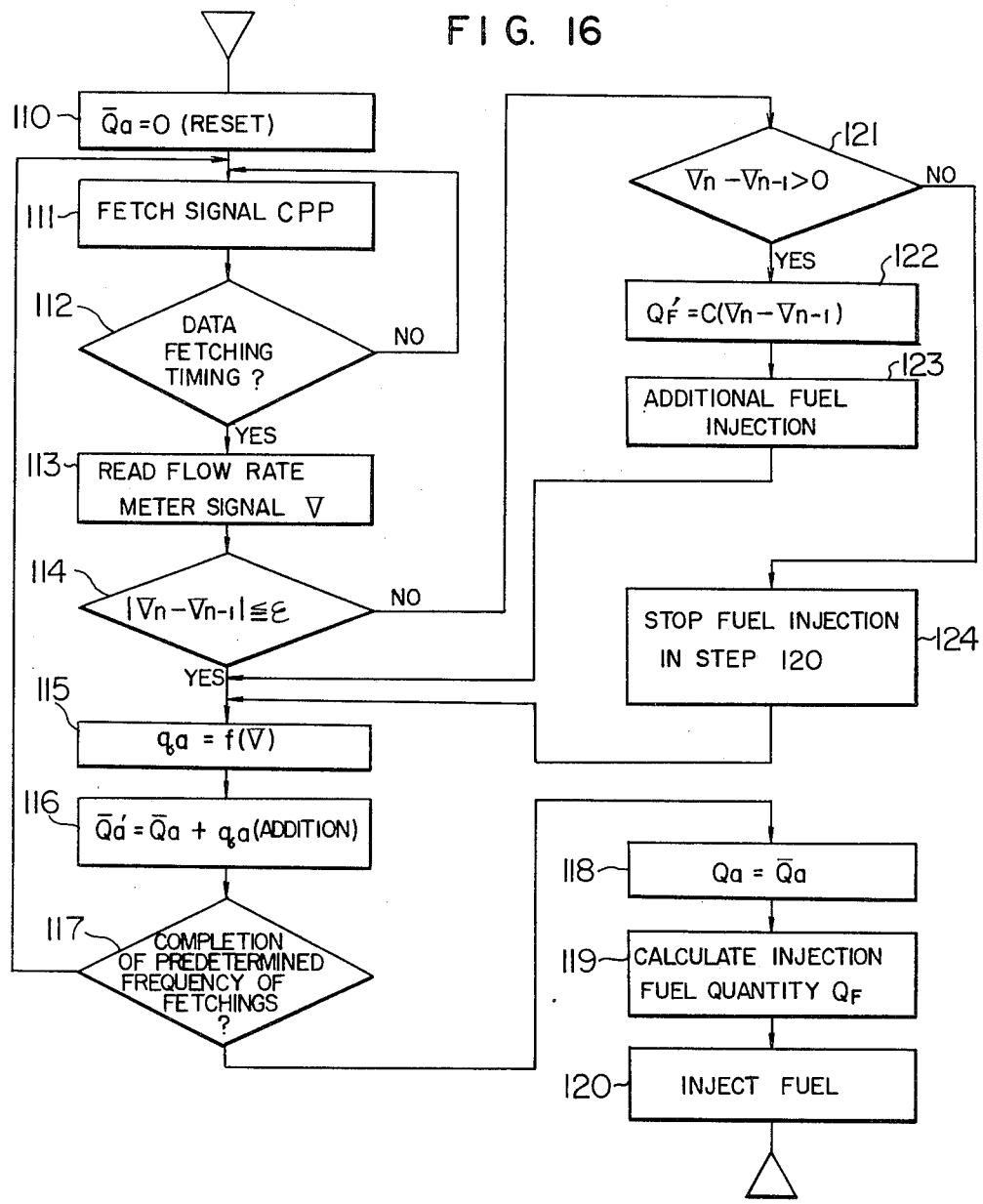
FIG. 16 is a flow chart useful in explaining a correction method, other than the extrapolation method, embodying the invention, for correcting the amount of fuel during the engine transient condition.
Figure 17:
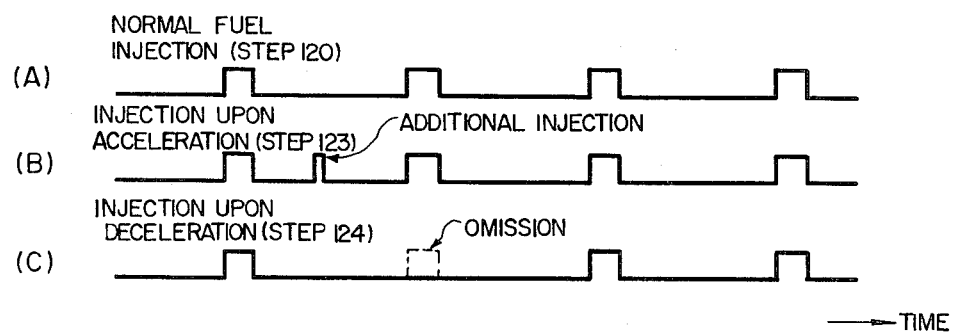
FIG. 17 illustrates in sections (A) through (C) waveforms used in the operation of FIG. 16 correction method.

Such a fuel correction method will be described in more detail with reference to FIGS. 16 and 17. Steps 110 through 113 in FIG. 16 are identical with those in FIG. 15. The difference between the present instantaneous value of the flow rate meter signal V and the previous instantaneous value is examined as to whether or not it exceeds the predetermined value $\epsilon$ (step 114). When the difference is below the value $\epsilon$, the average is determined by accumulation of individual instantaneous values during one intake stroke as in FIG. 15 (steps 115 to 118) and in accordance with this result, the fuel injection is carried out (steps 119 to 120). When the difference, $|V_n - V_{n-1}|$, is above the value $\epsilon$, the polarity of $V_n - V_{n-1}$ is examined (step 121). With the positive difference indicating that acceleration is present, the amount of fuel to be injected is calculated in step 122, where C is a coefficient, and additional injection of fuel is carried out immediately (step 123). A pulse used for the additional injection is shown at section (B) in FIG. 17. When the negative difference takes place indicating that deceleration is present, the normal injection is put aside (step 124). Namely, one fuel injection is removed during the concerned intake stroke (see section (C) in FIG. 17). The routine of this flow chart is started by the crank angle signal CRP.

We claim:

1. A method of operating a control apparatus for controlling the operation of an internal combustion engine, said apparatus including sensor means including an air flow rate meter and a crankshaft rotation angle sensor for generating output signals representative of operating conditions of the engine;

actuator means, including at least a fuel injector, for controlling operating conditions of the engine in response to control signals applied thereto; and a data processing unit including central processor, random access memory and read only memory, for executing data calculations based upon output signals generated by said sensor means and producing therefrom control signals to be coupled to said actuator means for controlling operating conditions of the engine;

said method comprising the steps of:
(a) sampling output signals generated by said air flow rate meter and said crankshaft rotation angle sensor at predetermined timings;
(b) storing, in said random access memory, said sampled output signals;
(c) executing, in said central processor, a first prescribed calculation in accordance with selected ones of the signal samples stored in said random access memory representative of air flow rate and thereby producing first extrapolated air flow rate data;
(d) executing, in said central processor, a second prescribed calculation in accordance with selected ones of the signal samples stored in said random access memory representative of crankshaft rotation speed and thereby producing first extrapolated crankshaft rotation speed data;
(e) executing, in said central processor, a third prescribed calculation in accordance with a prescribed relationship between said first extrapolated air flow rate data and said first extrapolated crankshaft rotation speed data and producing therefrom a fuel injection control signal representative of the amount of fuel to be injected by said fuel injector based upon said third prescribed calculation; and
(f) applying said fuel injection control signal to said injector.

2. A method according to claim 1, wherein said first prescribed calculation is defined by $$Q_{an+2} = Q_{an} + X_1(Q_{an} - Q_{an-1}),$$

where $Q_{an+2}$ corresponds to said extrapolated air flow rate data,
$Q_{an}$ and $Q_{an-1}$ correspond to said selected ones of stored signal samples representative of air flow rate data at different sampling times, and
$X_1$ is a first prescribed coefficient,
said second prescribed calculation is defined by $$N_{n+2} = N_n + X_2(N_n - N_{n-1}),$$

where $N_{n+2}$ corresponds to said extrapolated crankshaft rotation speed data, $N_n$ and $N_{n-1}$ corresponds to said selected ones of stored signals representative of crankshaft rotation speed data at different sampling times, and $X_2$ is a second prescribed coefficient, and said third prescribed calculation is defined by $$Q_F = K \cdot Q_{an+s}/N_{n+2},$$

where $Q_F$ corresponds to the amount of fuel to be injected, and

K is a third prescribed coefficient.

3. A method according to claim 1, wherein said actuator means further includes an ignitor, and wherein said method further comprises the step of:

(g) generating an ignition timing signal in accordance with the result of said third prescribed calculation.

4. A method according to claim 1, wherein said actuator means further includes an exhaust gas recirculation valve actuator, and wherein said method further comprises the step of:

(g) generating an exhaust gas recirculation valve actuator control signal in accordance with the result of said third prescribed calculation.

5. A method according to claim 1, wherein said air flow rate meter comprises a hot wire type air flow rate meter and wherein said sensor means includes means for generating samples of the output of said hot wire type air flow meter at predetermined times or predetermined crank angles and integrating, during each intake stroke, said samples, to thereby generate an average air flow rate representative signal.

6. A method of operating a control apparatus for controlling the operation of an internal combustion engine, said apparatus including sensor means including an intake negative pressure sensor for generating output signals representative of operating conditions of the engine;

actuator means, including at least a fuel injector, for controlling operating conditions of the engine in response to control signals applied thereto; and a data processing unit including central processor, random access memory and read only memory, for executing data calculations based upon output signals generated by said sensor means and producing therefrom control signals to be coupled to said actuator means for controlling operating conditions of the engine;

said method comprising the steps of:

(a) sampling output signals generated by said intake negative pressure sensor at predetermined timings;

(b) storing, in said random access memory, said sampled output signals;

(c) executing, in said control processor, a first prescribed calculation in accordance with selected ones of the signal samples stored in said random access memory representation of intake negative pressure and thereby producing first extrapolated intake negative pressure data;

(d) executing, in said control processor, a second prescribed calculation in accordance with a prescribed relationship between said first extrapolated intake negative pressure data and atmospheric pressure and producing therefrom a fuel injection control signal representative of the amount of fuel to be injected by said fuel injector based upon said second prescribed calculation; and (e) applying said fuel injection control signal to said injector.

7. A method according to claim 6, wherein said first prescribed calculation is defined by $$P_{n+2} = P_n = X_3(P_n - P_{n-1}),$$

where $P_{n+2}$ corresponds to said extrapolated intake negative pressure, $P_n$ and $P_{n-1}$ correspond to said selected ones of stored signal samples representative of intake negative pressure at different sampling times, and $X_3$ is a first prescribed coefficient, and said second prescribed calculation is defined by $$Q_F = K_1(P_a - P_{n-2}),$$

where $Q_F$ corresponds to the amount of fuel to be injected, $K_1$ is a second prescribed coefficient, and $P_a$ is atmospheric pressure.

8. A method according to claim 6, wherein said actuator further includes an ignitor and said sensor means include a crankshaft rotation angle sensor, and wherein step (a) includes sampling output signals generated by said crankshaft rotation angle sensor at predetermined timings, and wherein said method further comprises the steps of:

(f) executing, in said central processor, a third prescribed calculation in accordance with selected ones of the signal samples stored in said random access memory representative of crankshaft rotation speed and thereby producing first extrapolated crankshaft rotation speed data; and (g) generating an ignition timing signal in accordance with the result of said second and third prescribed calculations to be applied to said ignitor.

9. A method according to claim 8 wherein said third prescribed calculation is defined by $$N_{n+2} = N_n + X_2(N_n - N_{n-1}),$$

where $N_{n+2}$ corresponds to said extrapolated crankshaft rotation speed data, $N_n$ and $N_{n-1}$ correspond to said selected ones of stored signals representative of crankshaft rotation speed data at different sampling times, and $X_2$ is a third prescribed coefficient.

10. A method according to claim 6, wherein said actuator means further includes an exhaust gas recirculation valve actuator, and wherein said method further comprises the step of:

(f) generating an exhaust gas recirculation valve actuator control signal in accordance with the result of said second prescribed calculation.

11. A method according to claim 6, wherein said sensor means includes means for generating samples of the output of said intake negative pressure sensor at predetermined times or predetermined crank angles and integrating, during each intake stroke, said samples, to thereby generate an average intake negative pressure representative signal.

12. A method of operating a control apparatus for controlling the operation of an internal combustion engine, said apparatus including sensor means including an air flow rate meter and a crankshaft rotation angle sensor for generating output signals representative of operating conditions of the engine;

actuator means, including at least a fuel injector, for controlling operating conditions of the engine in response to control signals applied thereto; and a data processing unit including central processor, random access memory and read only memory, for executing data calculations based upon output signals generated by said sensor means and producing therefrom control signals to be coupled to said actuator means for controlling operating conditions of the engine;

said method comprising the steps of:
(a) sampling output signals generated by said air flow rate meter and said crankshaft rotation angle sensor at predetermined timings;
(b) storing, in said random access memory, said sampled output signals;
(c) coupling selected ones of the signal samples stored in said random access memory representative of air flow rate to said central processor;
(d) comparing in said central processor, the values of signal samples coupled thereto in step (c) and producing an output signal representative of a change in the amount of fuel to be injected in response to the absolute value of the difference between said signal values exceeding a predetermined value;
(e) executing, in said central processor, a prescribed calculation in accordance with selected ones of the signal samples representative of air flow rate and crankshaft rotation speed, and producing therefrom a fuel injection control signal representative of the amount of fuel to be injected by said fuel injector; and
(f) applying said fuel injection control signal to said injector.

13. A method according to claim 12, wherein
step (e) includes the step of executing, in said central processor, a second prescribed calculation and producing therefrom an additional fuel injection control signal representative of an additional amount of fuel to be injected by said fuel injector, when said difference in step (d) is positive, and
step (f) includes applying said additional fuel injection control signal to said injector.

14. A method according to claim 13, wherein step (f) includes the step of inhibiting, during a respective intake stroke, the injection of fuel by said injector in response to said difference in step (d) being negative, thereby decreasing the amount of fuel to be injected.

15. A method according to claim 13, wherein said second prescribed calculation is defined by:

$$Q_F' = C(V_n - V_{n-1}),$$

wherein $Q_F'$ represents said additional amount of fuel to be injected, $V_n$ and $V_{n-1}$ represent selected ones of air flow rate representative signal samples, and C is a coefficient.

* * * * *